Feb. 24, 1931. C. H. ROLKER 1,793,870
AEROPLANE SAFETY APPLIANCE
Filed March 19, 1930 5 Sheets-Sheet 2
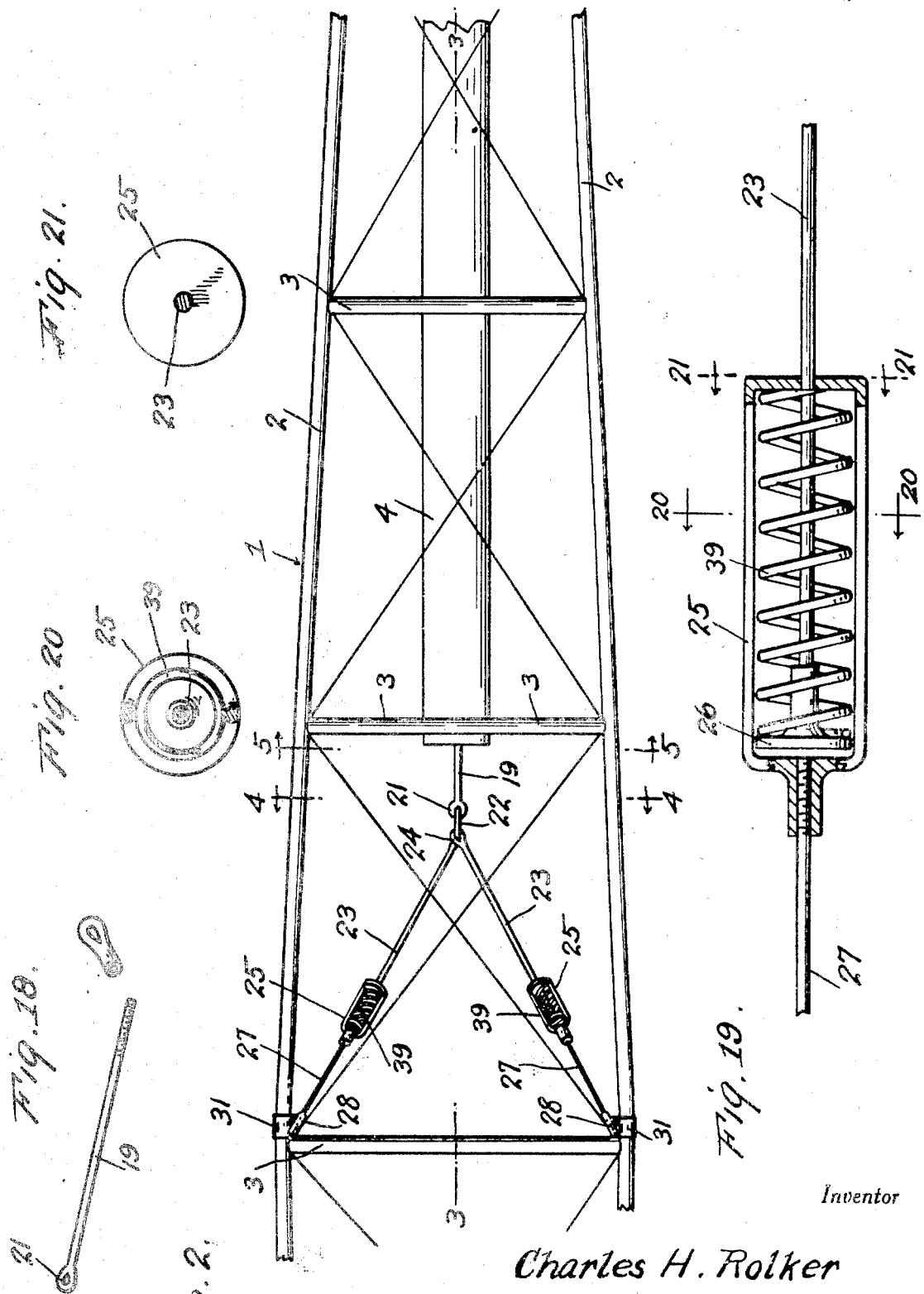

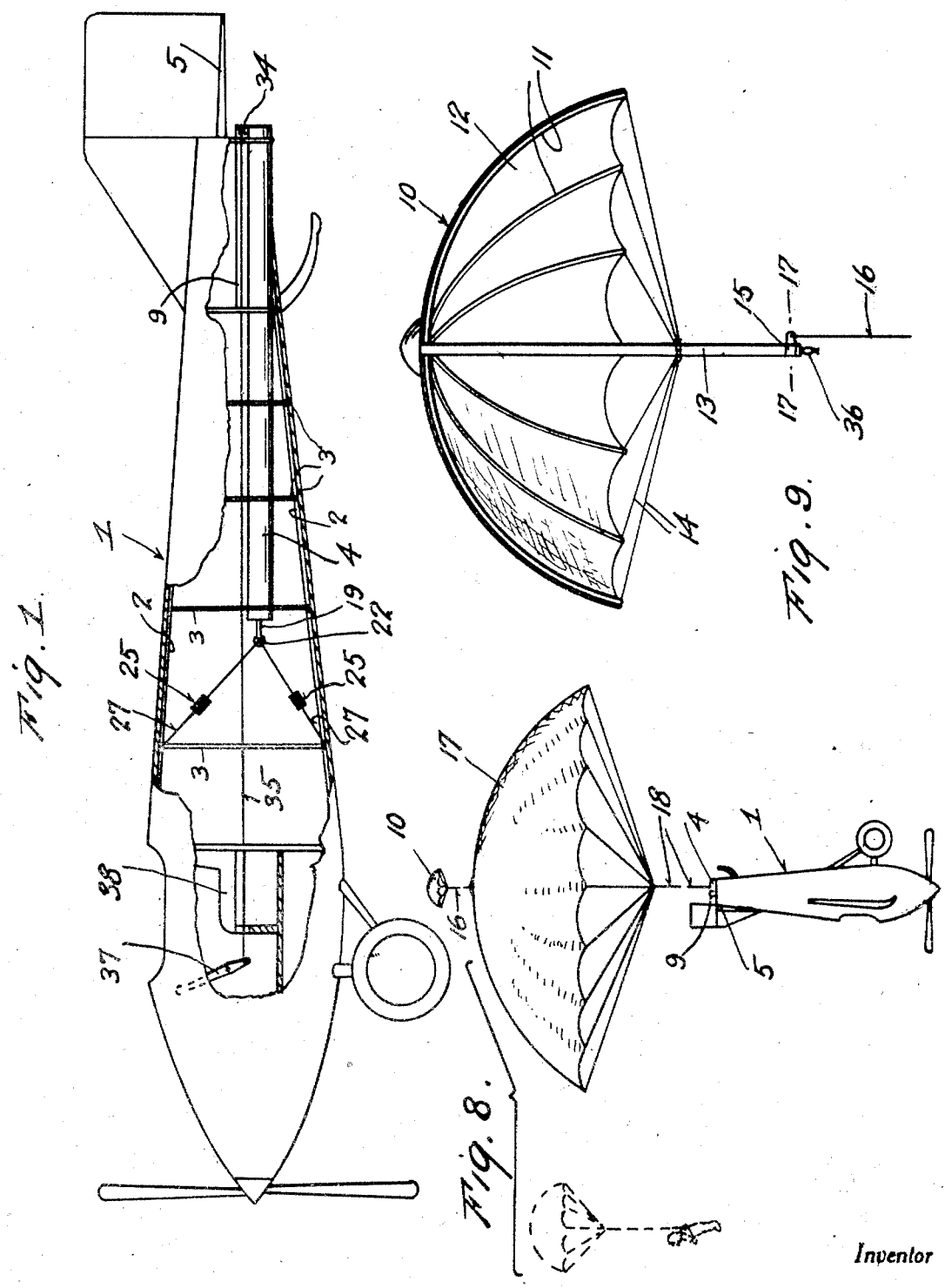

Feb. 24, 1931.  C. H. ROLKER  1,793,870
AEROPLANE SAFETY APPLIANCE
Filed March 19, 1930   5 Sheets-Sheet 3
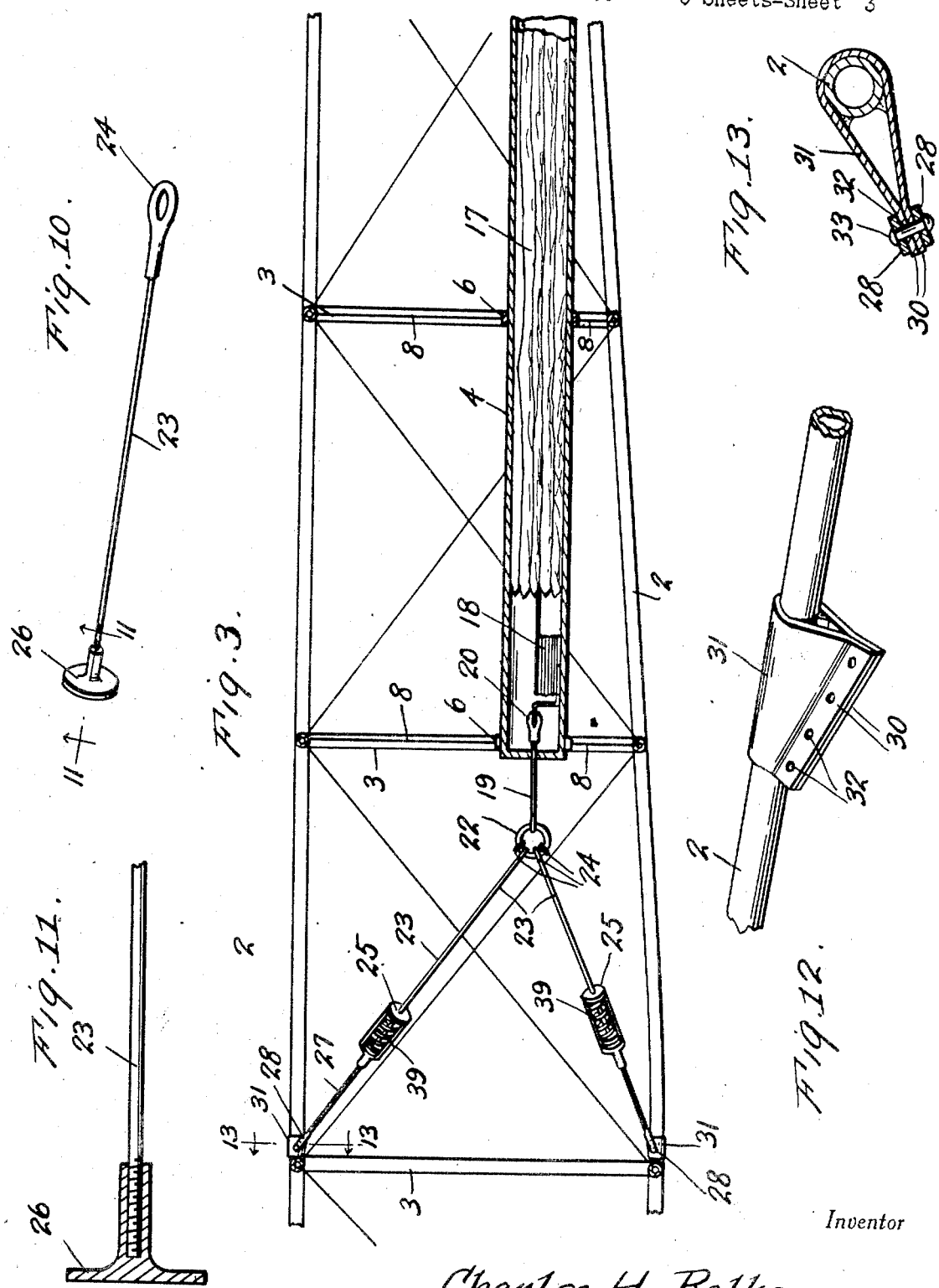
Inventor
Charles H. Rolker
By Clarence A. O'Brien
Attorney

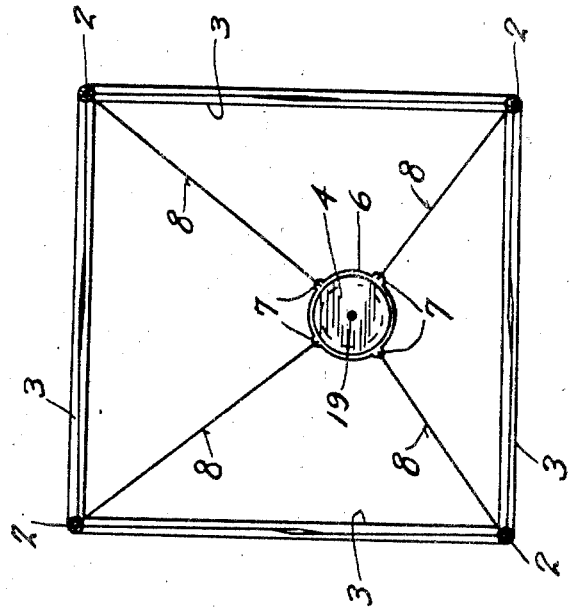
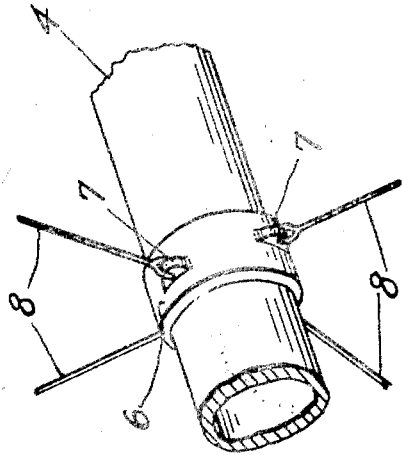
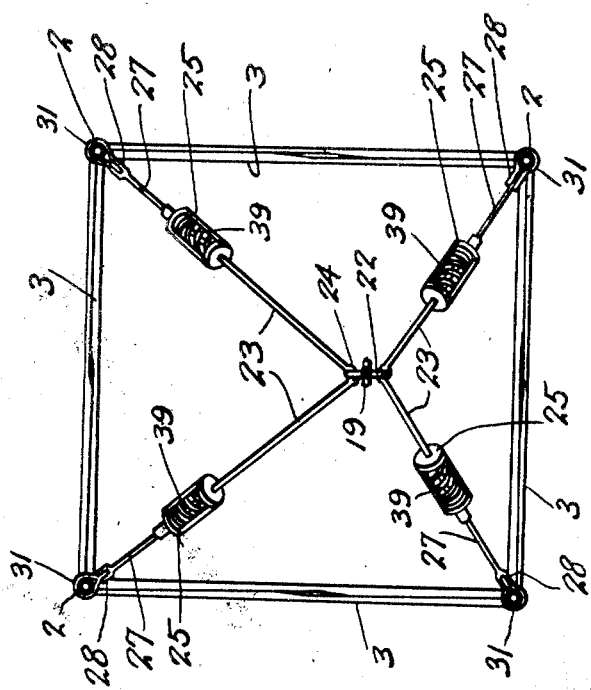
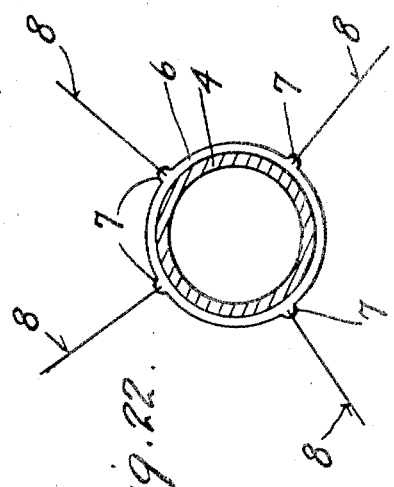

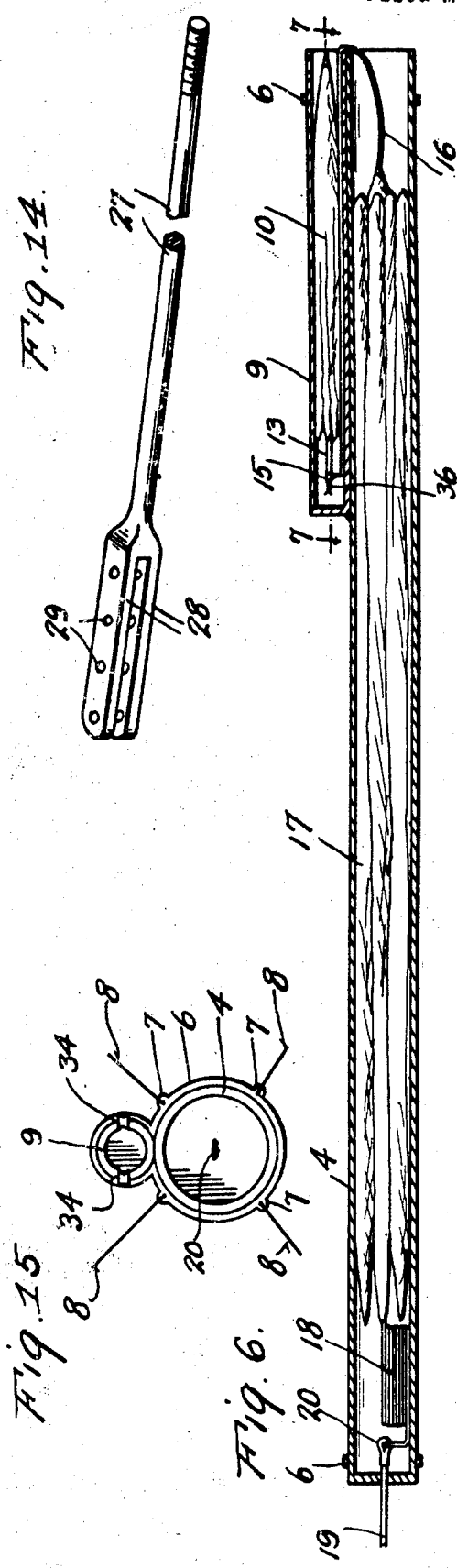

Patented Feb. 24, 1931

1,793,870

UNITED STATES PATENT OFFICE

CHARLES HENRY ROLKEL, OF LOS ANGELES, CALIFORNIA

AEROPLANE SAFETY APPLIANCE

Application filed March 19, 1930. Serial No. 437,089.

This invention relates to new and useful improvements in aeroplane safety appliances and more particularly to a device of this character in the nature of a parachute and has for its primary object to provide, in a manner as hereinafter set forth, a parachute arranged in the rear end portion of the fuselage of the aeroplane in a manner to be expeditiously released to cause the plane to descend slowly when the same has become disabled from any cause, thus avoiding material damage to the plane and injury to the occupants thereof.

Other objects of the invention are to provide an aeroplane safety appliance of the aforementioned character which will be simple in construction, strong, durable, efficient in its use and which may be manufactured and installed at low cost on conventional types of aeroplanes without the necessity of materially changing or altering the same.

All of the foregoing and still further objects and advantages of the invention may become apparent from a study of the following specification, taken in connection with the accompanying drawings wherein like characters of reference designate corresponding parts throughout the several views, and wherein:—

Figure 1 is a view partly in side elevation and partly in vertical longitudinal section showing the fuselage of an aeroplane with a safety appliance in accordance with this invention installed therein.

Figure 2 is a fragmentary view in top plan showing an intermediate portion of the fuselage frame and the forward portion of this invention mounted in position therein.

Figure 3 is a fragmentary view in vertical longitudinal section taken substantially on the line 3—3 of Figure 2.

Figure 4 is a cross-sectional view taken substantially on the line 4—4 of Figure 2 looking in the direction indicated by the arrows.

Figure 5 is a cross-sectional view taken substantially on the line 5—5 of Figure 2 looking in the direction indicated by the arrows.

Figure 6 is an enlarged detail view in vertical longitudinal section showing the main parachute and the pilot parachute mounted in position in the housings or casings provided therefor.

Figure 7 is a horizontal longitudinal sectional view taken substantially on the line 7—7 of Figure 6.

Figure 8 is a view showing the pilot or other occupant who has left the aeroplane descending by means of an individual parachute.

Figure 9 is a detail view in cross-section through the pilot parachute.

Figure 10 is a detail view in perspective showing one of the connecting elements for coupling the main parachute to the framework of the aeroplane fuselage.

Figure 11 is an enlarged detail view in section taken substantially on the line 11—11 of Figure 10.

Figure 12 is an enlarged detail view in perspective showing one of the connecting brackets which is rigidly mounted on the longitudinal members of the fuselage frame for anchoring the parachute connecting rods thereto.

Figure 13 is an enlarged detail view in cross section taken substantially on the line 13—13 of Figure 3, looking in the direction indicated by the arrows.

Figure 14 is an enlarged detail view in perspective showing the complementary section to the connecting rod illustrated in Figure 10 and which is anchored to the supporting devices or brackets illustrated in Figures 12 and 13.

Figure 15 is a detail view in rear end elevation looking into the main parachute and pilot parachute casings.

Figure 16 is an enlarged detail view showing the means of securing the releasing cable to the free end of the pilot parachute shaft.

Figure 17 is a detail view in cross-section taken substantially on the line 17—17 of Figure 9 showing the means of connecting the cable to the pilot parachute which extends to the main parachute.

Figure 18 is a detail view in perspective of another of the elements for connecting the main parachute to the fuselage frame of the areoplane.

Figure 19 is a fragmentary detail view in section showing the resilient means whereby the connecting rod illustrated in detail in Figures 10 and 14 are coupled together.

Figure 20 is a detail view in cross section taken substantially on the line 20—20 of Figure 19 looking in the direction indicated by the arrows.

Figure 21 is a detail view in cross-section taken substantially on the line 21—21 of Figure 19.

Figure 22 is a detail view in cross-section showing the means for supporting the main parachute casing.

Figure 23 is a detail view in perspective showing the supporting means for the main parachute casing.

Referring to the drawings in detail, it will be seen that the reference numeral 1 designates generally the fuselage of an aeroplane of the usual construction and including the longitudinally extending corner frame members 2 and the intermediate struts 3.

An elongated cylindrical metallic casing 4 is mounted longitudinally in the fuselage 1 at the rear thereof and said casing is provided with an open rear end which projects outwardly from the rear end of the fuselage beneath the elevator 5 of the aeroplane. As clearly seen in the drawings, the forward end of the casing 4 is closed. As best illustrated in Figures 5, 22 and 23 of the drawings, the casing 4 is supported in position in the fuselage 1 through the medium of a plurality of longitudinally spaced rings 6 which encircle the same and have circumferentially spaced apertured ears 7 formed integrally thereon for connecting the supporting wires or rods 8 thereto, said wires or rods having their opposite ends connected to the longitudinal members 2 of the fuselage at a point therein where the struts 3 are connected thereto.

Formed integrally on the upper side of the casing 4 and on the rear end portion thereof is a comparatively small cylindrical casing 9 which is also opened at its rear end and closed at its forward end, as clearly indicated in Figure 6 of the drawings. The comparatively small casing 9 is adapted to house a pilot parachute 10 of the spring type which is illustrated in detail in Figure 9 of the drawings and comprises the resilient ribs 11 over which extends the cover 12, said ribs and the cover being mounted on one end portion of a shaft 13 and the free ends of the ribs 11 being secured to said shaft 13 at an intermediate portion thereof by the wires 14. The free end portion of the shaft 13 is provided with a circumferentially extending channel in which is disposed for rotation an annulus 15 (see Figure 17) to which is connected a cable 16 which extends into the casing 4 and is connected to the main parachute 17 which is folded and disposed in said casing 4.

The main parachute 17 is of conventional construction but is sufficiently large for the use for which the same is intended. The cable 18 is coiled in the forward end portion of the casing 4 and connected to the main parachute 17 in the usual manner and said cable has one end secured to a rod 19 which is loosely mounted through the forward end wall of the casing through the medium of an eye 20 (see Figure 18) which is threaded on to said rod 19. The opposite end of the rod 19 is provided with an integral eye 21 by means of which a ring 22 is loosely connected thereto.

Loosely connected to the ring 22 is a plurality of rods 23 having eyes 24 threaded on one end thereof for connection with said ring 22. Each of said rods 23 has its opposite end portion extending slidably into a cage 25 and has threaded thereon a circular head 26 adapted for longitudinal movement in the cage 25. The cage 25 into which each of the rods 23 extends is threaded on the adjacent end of another rod 27 which, as clearly illustrated in Figure 14 of the drawings, has its opposite end formed to provide furcations 28 provided with aligned pairs of openings 29. The furcations 28 are adapted to embrace the opposed flange portion 30 of a bracket 31 (see Figures 12 and 13) which are secured by suitable means such as welding, to the longitudinal members 2 of the fuselage frame 1 at a point adjacent some of the struts 3. The flange portions 30 are provided with spaced openings 32 adapted for registry with the openings 29 of the furcations 28 for the passage of a securing element such as a rivet 33.

As illustrated to advantage in Figure 7 of the drawings, the casing 9 of the pilot parachute has journaled in its rear end portion and on diametrically opposite side the pulleys 34 over which is trained a cable 35 having an intermediate portion extending into the housing 9 and disposed through a resilient clip 36 mounted on the free end of the shaft 13 of the pilot parachute 10. The cable 35 extends longitudinally through the fuselage and has both of its ends connected to the lower end of an actuating lever 37 which is mounted in the pilot compartment of the fuselage. If desired, the cable 35 may be trained over pulleys in the pilot compartment and provided with handle means to facilitate the gripping thereof when it is desired to release the parachute. The reference numeral 38 designates the pilot seat in Figure 1 of the drawings.

In use, should the aeroplane be disabled in flight, the operator gives the lever 37 a quick swinging movement in a manner to eject the pilot parachute 10 through the medium of the cable 35. When the pilot parachute is free of the casing 9, the same automatically opens in the usual manner and pulls the main parachute 17 out of the open rear end of the casing 4 through the medium of the connecting cable 16. It should be here mentioned that the construction of the clip 36 on the free end of the shaft 13 of the pilot parachute is such that the cable 35 will be released therefrom after the pilot parachute opens. When the main parachute 17 is free of the housing 4, the same opens and the aeroplane is supported therefrom through the medium of the cable 18, rods 19, ring 22 and the rods 23 and 27. The compression springs 39 which are disposed in the cage 25 and encircle the end portions of the rod 23 and have one end impinged against the heads 26 and the opposite end impinged against the end wall of the cage 25 all for the purpose of absorbing the initial shock which occurs when the main parachute 17 first opens. Whenever possible, the aeroplane should be put into a stall just before releasing the parachute in order to reduce the resulting shock to a minimum. The wires or rods 8 which support the casing 4 will also function as diagonal cross braces for the fuselage frame, as will be apparent.

It is believed that the many advantages of an aeroplane safety appliance constructed in accordance with this invention will be readily understood, and although the preferred embodiment of the invention is as illustrated and described, it is to be understood that changes in the details of construction may be had which will fall within the scope of the invention as claimed.

What is claimed is:—

1. An aeroplane safety appliance of the character described comprising a pair of cylindrical casings mounted longitudinally in the fuselage of the aeroplane, said casings having open rear ends projecting from the rear end of the fuselage, a pilot parachute mounted in one of the casings, a main parachute mounted in the other of the casings, a cable operatively connecting the main and pilot parachutes together, pulleys mounted on diametrically opposite side of the casings in which the pilot parachute is disposed at the rear end portion of said casing, and means for manually ejecting the pilot parachute from the casing comprising a cable, actuating means connected to the cable, said cable having intermediate portions trained over the pulleys and further having an intermediate portion extending into the casing in which the pilot parachute is mounted and operatively connected to said pilot parachute.

2. An aeroplane safety appliance of the character described comprising a large casing and a small casing mounted longitudinally in the fuselage of the aeroplane, each casing having an open rear end projecting from the rear end of the fuselage, a pilot parachute mounted in the smaller casing, a main parachute mounted in the large casing, a cable operatively connecting the pilot parachute to the main parachute, manually operable means for ejecting the pilot parachute from the small casing, and means for yieldingly connecting the main parachute to the frame of the fuselage comprising a rod extending into the forward end portion of the large casing, a cable connecting said rod to the main parachute, a plurality of diverting rods loosely connected to the forward end of the first named rod, and a plurality of rods slidably connected to the second named rod at one end and having their opposite ends anchored to the fuselage frame, and compressible springs operatively disposed between the connected ends of the second and third named rods.

In testimony whereof I affix my signature.

CHARLES HENRY ROLKER.